(12) United States Patent
Banko et al.

(10) Patent No.: US 11,763,398 B2
(45) Date of Patent: Sep. 19, 2023

(54) EXPANDING SEMANTIC CLASSES VIA USER FEEDBACK

(71) Applicant: DISCORD INC., San Francisco, CA (US)

(72) Inventors: Michele Banko, San Francisco, CA (US); Alok Puranik, San Francisco, CA (US); Taylor Rhyne, San Francisco, CA (US)

(73) Assignee: DISCORD INC., San Francisco, CA (US)

( * ) Notice: Subject to any disclaimer, the term of this patent is extended or adjusted under 35 U.S.C. 154(b) by 0 days.

(21) Appl. No.: 17/834,218

(22) Filed: Jun. 7, 2022

(65) Prior Publication Data

US 2022/0301551 A1 Sep. 22, 2022

Related U.S. Application Data

(63) Continuation of application No. 16/536,043, filed on Aug. 8, 2019, now Pat. No. 11,373,636.

(51) Int. Cl.
*G06F 40/30* (2020.01)
*G06Q 50/00* (2012.01)
*G10L 15/08* (2006.01)
*G06F 18/214* (2023.01)
*G06F 18/2431* (2023.01)

(52) U.S. Cl.
CPC .......... *G06Q 50/01* (2013.01); *G06F 18/214* (2023.01); *G06F 18/2431* (2023.01); *G10L 15/08* (2013.01)

(58) Field of Classification Search
CPC .... G06K 9/6256; G06K 9/6257; G06K 9/626; G06K 9/6262; G06K 9/628; G06K 9/6281; G06K 9/6288; G06Q 50/01; G06F 40/30; G06F 10/166; G06F 40/169
USPC ...................................... 704/231, 200, 1–10
See application file for complete search history.

(56) References Cited

U.S. PATENT DOCUMENTS

| | | | |
|---|---|---|---|
| 7,167,825 | B1 | 1/2007 | Pötter |
| 9,697,192 | B1 * | 7/2017 | Estes ........................ G06F 40/30 |
| 9,818,080 | B2 | 11/2017 | Cai et al. |
| 10,467,339 | B1 | 11/2019 | Shen |
| 10,637,826 | B1 * | 4/2020 | Luo ..................... H04L 63/0227 |
| 2006/0229862 | A1 | 10/2006 | Ma et al. |
| 2011/0283230 | A1 | 11/2011 | Gnanasambandam |

(Continued)

*Primary Examiner* — Daniel Abebe
(74) *Attorney, Agent, or Firm* — Polsinelli PC

(57) ABSTRACT

The present technology extends to methods, systems, and computer program products for expanding semantic classes via user feedback. Aspects of the technology learn how a set of labels can be expanded from user-generated tags. Text labels applied by human reviewers to digital content can be inspected and compared to one another. When a threshold of human-generated text tags contain similar terminology, the set of labels can be expanded to define a representation of the similar terminology. Similar terminology can include terms that originate from the same base term, are synonyms, are more specific terms related to a general term category, etc. Similar terminology can be consolidated into a defining term that is used to generate a new (more granular) label or a new top level label. Accordingly, new semantic classes can be discovered from user-generated feedback. New semantic classes can provide a more granular representation of content item classification.

20 Claims, 4 Drawing Sheets

(56) References Cited

U.S. PATENT DOCUMENTS

| | | |
|---|---|---|
| 2016/0055147 A1 | 2/2016 | Duan et al. |
| 2018/0307768 A1 | 10/2018 | Hu |
| 2019/0005043 A1 | 1/2019 | Hemani et al. |
| 2019/0164290 A1 | 5/2019 | Wang et al. |
| 2020/0110839 A1 | 4/2020 | Wang et al. |
| 2020/0327426 A1* | 10/2020 | Li .......................... G06F 40/30 |
| 2020/0349736 A1 | 11/2020 | Mustafi et al. |
| 2022/0414128 A1* | 12/2022 | Raimondo .......... G06F 16/3344 |

* cited by examiner

EXPANDING SEMANTIC CLASSES VIA USER FEEDBACK

CROSS-REFERENCE TO RELATED APPLICATIONS

This application is a continuation and claims the benefit of U.S. application Ser. No. 16/536,043, filed on Aug. 8, 2019, which is expressly incorporated by reference herein in its entirety.

BACKGROUND

1. Technical Field

This technology relates generally to expanding sets of semantic classes via user feedback, and, more particularly, to detecting types of speech within content items.

2. Related Art

Social media networks conventionally attempt to prevent propagation of toxic speech, such as, for example, racial slurs, aggressive language, homophobic language, etc. When toxic speech is detected in a message, social media networks can delete the message and take disciplinary action (e.g., suspension, ban, etc.) against the account that posted the message. Social media networks can use human moderators as well as some automated systems to identify toxic speech. Due to the sheer volume of social media interactions, many social media networks also rely on their users to alert them to messages that possibly contain toxic speech. For example, users can tag messages that are then reviewed by human moderators.

BRIEF DESCRIPTION OF THE DRAWINGS

The specific features, aspects and advantages of the present technology will become better understood with regard to the following description and accompanying drawings where.

DETAILED DESCRIPTION

Figure 1:
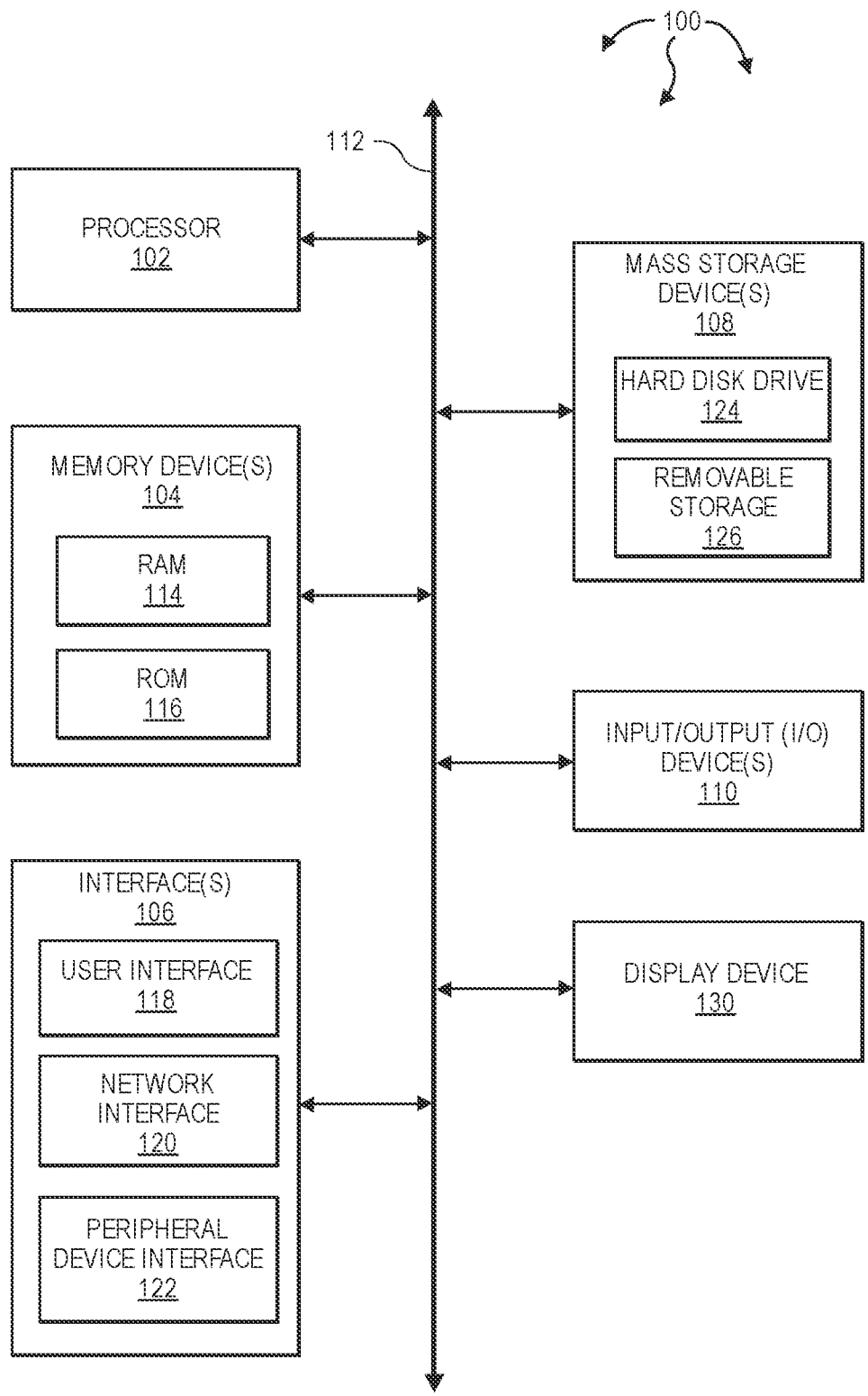
FIG. 1 illustrates an example block diagram of a computing device.

The present technology extends to methods, systems, and computer program products for expanding semantic classes via user feedback.

User feedback loops can start with a pre-defined, fixed set of labels, such as, for example, true/false, relevant/not-relevant, toxic/non-toxic, etc. For example, an initial set of labels for labeling content items (e.g., social media network interactions) can include various semantic classes, such as, for example, {toxic, non-toxic}. Aspects of the technology additionally learn how a set of labels can be expanded from user-generated tags. A user (e.g., a human moderator in a social media network) can tag a content item (e.g., a message) as a particular type of content item (e.g., as "toxic"). The tagged content item (e.g., message) can be forwarded to human moderators and/or other automated systems. The human moderators and/or automated systems can confirm (or deny) the content item type. For example, a human moderator and/or automated system can confirm or deny that a content item (e.g., an image, a video, audio, a web page, an email address, a forum post, a message, etc.) contains toxic content, such as, language, terminology, images, sounds, etc.

Content contained in similarly tagged content items (e.g., "toxic" messages) can be inspected and compared to one another. When a threshold (e.g., an amount, a percentage, etc.) of similarly tagged content items (e.g., "toxic" messages) contain similar terminology, the set of labels can be expanded to define a representation of the similar terminology. Within content items, similar terminology can include terms that originate from the same base term, are synonyms, are more specific terms related to a general term category, etc.

In one example, it may be that a specified number of messages including one or more of terms: {race, racism, racist, racial-prejudice, race-discrimination} are confirmed as "toxic". The terms {race, racism, racist, racial-prejudice, race-discrimination} can be resolved/consolidated into a new sematic class of "toxic-racist". The initial set of labels can then be refined/expanded to include a {toxic-racist} label. For example, the initial set of labels can be refined/expanded to: {toxic-racist, toxic-other, non-toxic}

When terminology in other "toxic" messages exceeds a threshold, the terminology can be resolved/consolidated into additional semantic classes. For example, one or more terms can be resolved/consolidated into a new sematic class of "toxic-gun-violence". The refined/expanded set of labels can then be further refined/expanded to include a {toxic-gun-violence} label. For example, the refined/expanded set of labels can be further refined/expanded to: {toxic-racist, toxic-gun-violence, toxic-other, non-toxic}.

Multiple levels of refinement/expansion are possible and a hierarchy of classes can be generated. Continuing with the example, a threshold of messages confirmed as "toxic-gun-violence" may include terminology related to mass shootings. The further refined/expanded set of labels can then be additionally refined/expanded to include a {toxic-gun-violence-mass-shooting} label. For example, the further refined/expanded set of labels can be additionally refined/expanded to: {toxic-racist, toxic-gun-violence-mass-shooting, toxic-gun-violence-other, toxic-other, non-toxic}.

Accordingly, new semantic classes can be discovered from user-generated feedback. The new semantic classes can provide a more granular representation of content item (e.g., message) classification.

Aspects can be implemented at any system(s) that generates content items. In one aspect, a set of labels is used across multiple content item generating systems, such as, for example, across multiple social media networks. As such, terminology identified by a content item generating system (e.g., one social media network) can be propagated to content item classification at another content item generating system (e.g., message classification at another social media network).

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
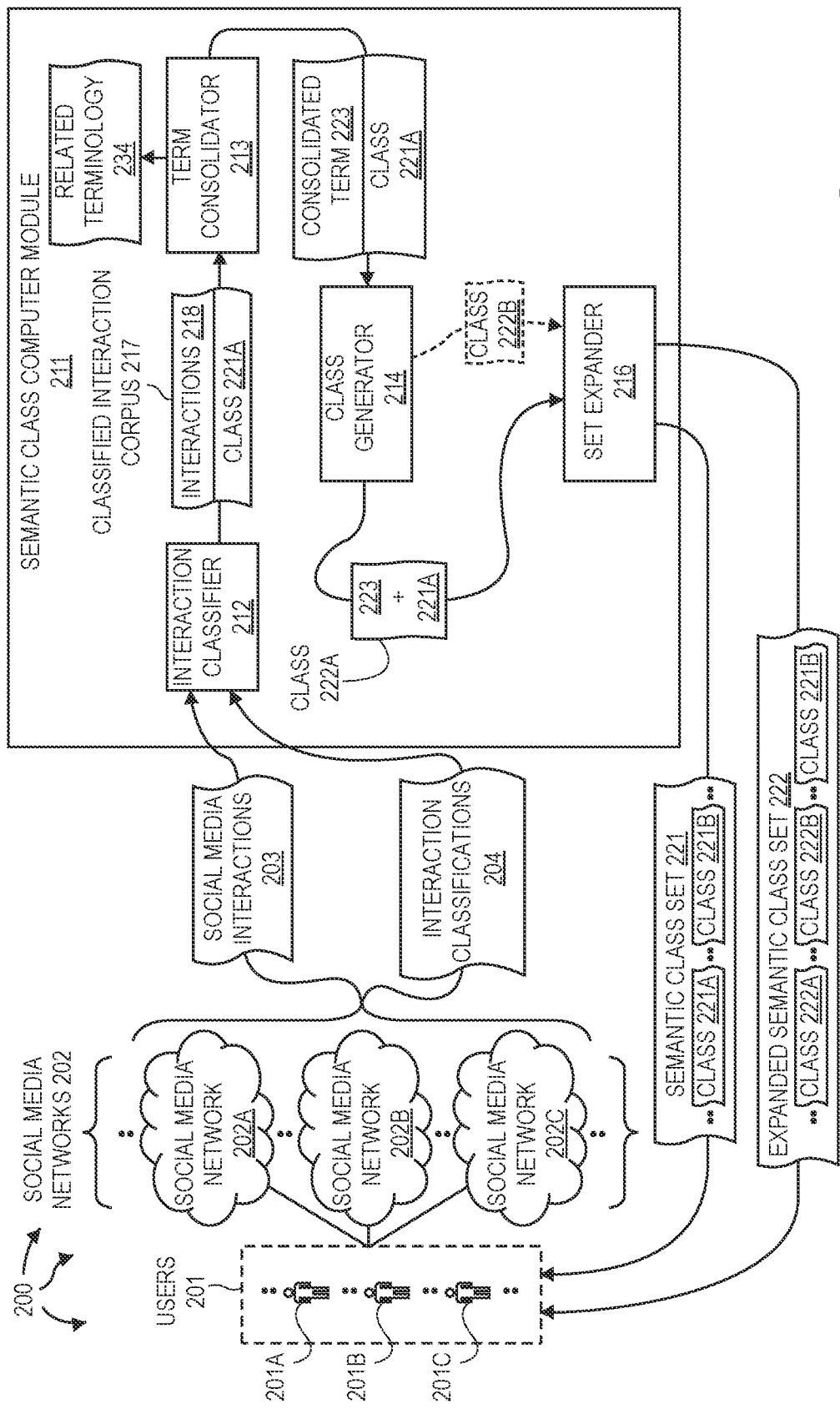
FIG. 2 illustrates an example computer architecture that facilitates expanding a semantic class set based on user-generated feedback.

FIG. 2 illustrates an example computer architecture 200 that facilitates expanding a semantic class set based on user-generated feedback. As depicted, users 201 have accounts with and/or use social media networks 202 (or other content item generating systems). Users 201 can interact (e.g., post messages and other content, view messages and other content, exchange messages and other content, etc.) with one another via social media networks 202 (or the other content item generating systems). Each of users 201 can have accounts with one or more social media networks (or other content item generating systems). For example, user 201A may be have account with social media networks 202A and 202B, user 201B may have an account with social media networks 202A, 202B, and 202C, user 201C may have an account with social media networks 202A and 202C, etc.

In one aspect, users 201 participate in social media interactions 203 (or other content item interactions) with one another across one or more of social media networks 202 (or other content item generating systems). Users 201 can classify social media interactions 203 (or other content item interactions) of other users 201 into any of classes 221A, 221B, etc. included in semantic class set 221. In another aspect, moderators moderate content items, such as, messages exchanged between users. The moderators can classify social media interactions 203 (or other content item interactions into any of classes 221A, 221B, etc. Classifications can occur through free-form input during reporting of objectionable content In one aspect, class 221A can be used to classify social media interactions (or other content item interactions) as "toxic" interactions and class 221B can be used to classify social media interactions (or other content item interactions) as "non-toxic" interactions. Social media networks 202 (or other content item generating systems) can indicate user classification of social media interactions 203 in interaction classifications 204 (or of other content item interactions in other classifications). A user that classifies a content item interaction (e.g., a message) can also annotate (tag) the (e.g., social media) interaction indicating why the interaction was so classified. The annotation can be considered part of the content of the interaction.

In general, semantic class computation module 211 can receive social media interactions 203 and interaction classifications 204 from social media networks 202 (or other content item interactions from other content item generating systems). Interaction classifier 212 can separate social media interactions 203 (as well as other content item interactions) into different corpora by class based on interaction classifications 204. Term consolidator 213 can inspect content within each classified interaction corpus. Term consolidator 213 can determine when a threshold (e.g., quantity, percentage, etc.) of interactions in a classified interaction corpus contain similar terminology. Similar terminology can include terms that originate from the same base term, are synonyms, are more specific terms (e.g., ammunition, bullets, shooting, etc.) related to a general term category (e.g., guns), etc.

When a threshold of interactions in a class contain similar terminology, term consolidator can consolidate the similarly terminology into a representative term. For example, a threshold number of social media messages (or other content items) may include one or more of the terms: {race, racism, racist, racial-prejudice, race-discrimination}. Term consolidator 213 can consolidate the terms {race, racism, racist, racial-prejudice, race-discrimination} into the representative term "racist". Term consolidator 213 can send the representative term and the class to class generator 214.

Class generator 214 can receive a representative term and class from term consolidator 213. Class generator 214 can generate a new (more granular) class by combining the representative term and the class into the new class. Class expansion can include creating sub-classes from a higher level class (vertical expansion) as well as creating new higher (e.g., top) level classes. For example, class generator 214 can generate a new class "toxic-homophobic". Class generator 214 may also generate an additional remainder class (e.g., "other") for social media interactions that are within the class but that are not within the new (more granular) class. For example, class generator 214 can generate a new class "toxic-homophobic" and a new class "toxic-other". "Toxic-other" can be used to label social media interactions as toxic when the social media interactions are "Toxic" for a reason other than being "homophobic"

Class generator 214 can send newly generated class to set expander 216. Set expander 216 can expand a semantic class set by including newly generated classes in an existing semantic class set. Class generator 214 can make semantic class sets available to users 201 and can permit users 201 to classify social media interactions into semantic classes included in semantic class sets.

A further example of vertical expansion incudes starting with a top-level semantic class, such as, terrorism. Subclasses, such as, terrorism_recruitment, terrorism_inciting_violence, or terrorism_imminent_threat, can be created by examining the tags applied by human reviewers (e.g., moderators).

An example of horizontal expansion incudes starting with three top-level semantic classes, such as, racism, sexism, and religious hate. A new fourth top-level semantic class physical_violence can be created by examining the tags applied by human reviewers (e.g., moderators).

Figure 3:
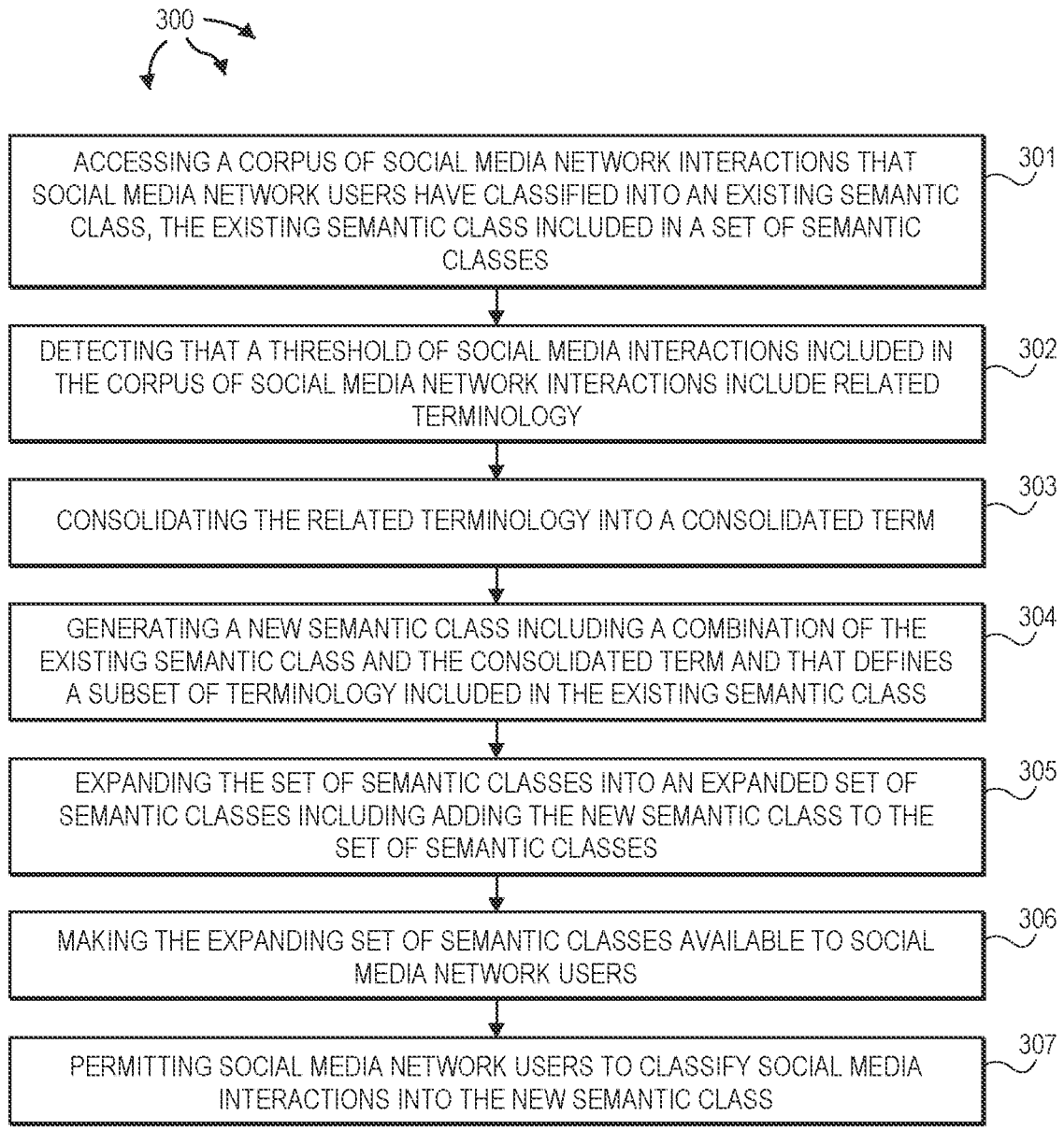
FIG. 3 illustrates a flow chart of an example method for expanding a semantic class set based on user-generated feedback.

FIG. 3 illustrates a flow chart of an example method for expanding a semantic class set based on user-generated feedback. Method 300 will be described with respect to the components and data in computer architecture 200.

Example method 300 is described relative to social media messages and social media interactions. However, method 300 can also be used on other content items and content item interactions generated and propagated via other content item generating systems.

Semantic class computation module 211 can make semantic class set 221 available to users 201. Semantic class computation module 211 can permit users 201 to classify social media interactions occurring on social media networks 202 into classes 221A, 221B, etc.

As described, social media interactions 203 can include users 201 posting, reviewing, exchanging, etc. messages and other content (e.g., audio, video, images, documents, annotations, web pages, email addresses, forum posts, etc.) via social media networks 202 (or other networks). Users 201 can also classify social media interactions of other users into classes included in semantic class set 221 and annotate social media interactions indicating why they were so classified. For example, user 201A can classify a social media interaction associated with user 201B as being in class 221A, 221B, etc. In one aspect, class 221A indicates that a social media interaction is "Toxic". User 201A can also annotate the message indicating why she or he classified the social media interaction as "Toxic". Classified social media interaction classifications can be included in interaction classifications 204.

Interaction classifier 212 can access social media interactions 203 and interaction classifications 204 from social media networks 202. Based on interaction classifications 204, interaction classifier 212 can separate social media interactions 203 into different corpora by class based on interaction classifications 204. For example, interaction classifier 212 can formulate classified interaction corpus 217, including interactions 218 (a subset of social media interactions 203) classified in class 221A (e.g., "Toxic").

Method 300 includes accessing a corpus of social media network interactions that social media network users have classified into an existing semantic class, the existing semantic class included in a set of semantic classes (301). For example, term consolidator 213 can access classified interaction corpus 217, including interactions 218 classified in class 221A.

Method 300 includes detecting that a threshold of social media interactions included in the corpus of social media network interactions include related terminology (302). For example, term consolidator 213 can determine that a threshold of interactions 218 include related terminology 234. Method 300 includes consolidating the related terminology into a consolidated term (303). For example, term consolidator 213 can consolidate related terminology 234 into consolidated term 223. Term consolidator 213 can send consolidated term 223 and class 221A to class generator 214.

Method 300 includes generating a new semantic class including a combination of the existing semantic class and the consolidated term and that defines a subset of terminology included in the existing semantic class (304). For example, class generator 214 can generate class 222A combining consolidated term 223 and class 221A. Class 222A can define a subset of terminology included in class 221A. For example, if class 221A is "Toxic" and consolidated term 223 is "Racist", class 222A may "Toxic-Racist". Class generator 214 can send class 222A to set expander 216.

In one aspect, class generator 214 may also generate class 222B. Class 222B can be used to classify social media interactions that are associated with class 221A but that are not associated with class 222A. For example, if class 222A is "Toxic-Racist", class 222B may be "Toxic-Other". Class generator 214 can send class 222B to set expander 216. In another aspect, class 222B already exists from prior iterations of class generation.

Method 300 includes expanding the set of semantic classes into an expanded set of semantic classes including adding the new semantic class to the set of semantic classes (305). For example, set expander 216 can expand semantic class set 221 into expanded semantic class set 222. Set expander 216 can add class 222A (and optionally class 222B) to expanded semantic class set 222. In one aspect, class 221A is split into classes 222A and 222B and class 221A is removed from expanded semantic class set 222.

Method 300 includes making the expanded set of semantic classes available to social media network users (306). For example, semantic class computation module 211 can make expanded semantic class set 222 available to users 201. Method 300 includes permitting social media network users to classify social media interactions into the new semantic class (307). For example, semantic class computation module 211 can permit users 201 to classify social media interactions occurring on social media networks 202 into classes 222A, 222B, 221B, etc.

Users 201 can then classify social media interactions of other users into classes included in expanded semantic class set 222. For example, user 201B can classify a social media interaction associated with user 201C as being in class 222A, 222B, 221B, etc. Further social media interactions and social media interaction classifications can be sent to semantic class computation module 211. A further iteration of method 300 can be performed to possibly generate additional new semantic classes and make those available to users 201. Thus, in one aspect, a hierarchy of classes is generated/refined over time as use of new terminology exceeds thresholds.

Figure 4:
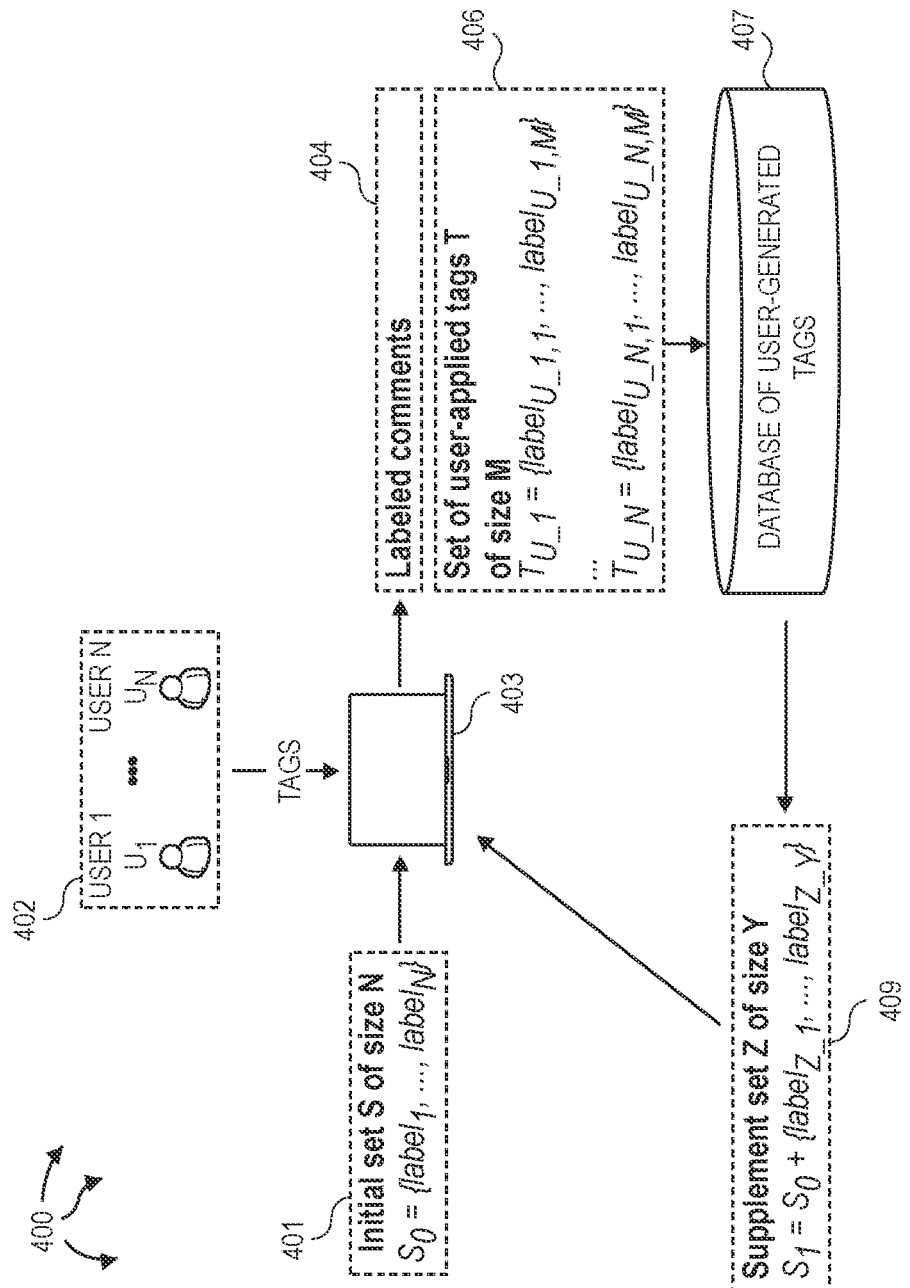
FIG. 4 illustrates another computer architecture that facilitates expanding a semantic class set based on user-generated feedback.

FIG. 4 illustrates another computer architecture 400 that facilitates expanding a semantic class set based on user-generated feedback. Computer systems 403 can access initial semantic class set 401. Users 402 can use computer systems 403 (e.g., connected to a social media network) to tag social media interactions with classes included in initial semantic class set 401 and create labeled comments 404. Labeled comments 404 (e.g., annotations) can be analyzed to determine user-applied tags 406. User-applied tags 406 can be stored in database of user-generated tags 407. Database of user-generated tags 407 can be resolved 408 into supplemental semantic class set 409. As depicted, supplemental semantic class set 409 includes initial semantic class set 401 ($S_0$) plus $\{label_{z\_1}, \ldots, label_{z\_y}\}$. That is, $S_1 = S_0 + \{label_{z\_1}, \ldots, label_{z\_y}\}$. Users In a more specific example, in a first iteration, a semantic class set includes {toxic, non-toxic}. 10% of messages tagged "toxic" include terminology (e.g., content, user annotations, etc.) in the set {race, racism, racist, racial-prejudice, race-discrimination}. 15% of messages tagged "toxic" include terminology (e.g., content, user annotations, etc.) in the set {gun, guns, gun-violence, weapon, shooting, bullets}.

In a second iteration, terms {race, racism, racist, racial-prejudice, race-discrimination} are resolved/consolidated to "racist" and terms {gun, guns, gun-violence, weapon, shooting, bullets} are resolved/consolidated to "gun-violence". The semantic class set is expanded from {toxic, non-toxic} to {toxic-racist, toxic-gun-violence, toxic-other, non-toxic}.

Aspects of the technology include using and can be implemented using machine learning, neural networks, and other automated mechanisms to reduce the workload of human moderators. For example, machine learning and neural network modules can be used to implement the functionality of modules included in semantic class computation module 211. Machine learning and neural network modules can also expand semantic classes based on user feedback more effectively and efficiently relative to human moderators.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, content items, content item classifications, social media interactions, social media interaction classifications, classified interaction corpora, interactions, classes, related terminology, consolidated terms, and semantic class sets, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, content items, content item classifications, social media interactions, social media interaction classifications, classified interaction corpora, interactions, classes, related terminology, consolidated terms, and semantic class sets, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the embodiments discussed above may comprise computer hardware, software, firmware, or any combination thereof to perform at least a portion of their functions. For example, a computer system may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching.

Further, it should be noted that any or all of the aforementioned alternate implementations may be used in any combination desired to form additional hybrid implementations of the disclosure.

What is claimed:

1. A computer-implemented method comprising:
   detecting that a threshold number of content items in a corpus of content items include related terminology, the corpus of content items being associated with initial semantic classes that classify the corpus of content items;
   based on the detection, generating, via a semantics class computer module, a consolidated term for a tag of a new semantic class based on the related terminology, the new semantic class being in addition to the initial semantic classes classifying the corpus of content items; and
   expanding the initial semantic classes into an expanded set of semantic classes by adding the tag corresponding to the new semantic class.

2. The computer-implemented method of claim 1, further comprising:
   receiving a classification of a number of the content items into the new semantic class.

3. The computer-implemented method of claim 1, wherein generating the new semantic class comprises generating a new semantic sub-class that defines a subset of terminology refining an existing semantic class.

4. The computer-implemented method of claim 3, wherein the expanding the initial semantic classes further comprises:
   resolving a database including the tags into a supplemental semantic class comprising the initial semantic classes coupled with a set of labels including the consolidated term as a new label, wherein the new label is associated with the new semantic class.

5. The computer-implemented method of claim 4, wherein the resolving the database expands the initial semantic classes by adding the new label that serves as a subset classification of the initial semantic classes.

6. The computer-implemented method of claim 4, further comprising:
   in addition to the new label, adding a catch-all label to the set of labels associated with other tags that do not contain the related terminology.

7. The computer-implemented method of claim 4, wherein the new semantic class classifies a different subset from other subsets of the initial semantic classes.

8. The computer-implemented method of claim 4, further comprising:
   detecting that another threshold number of second content items of the corpus of content items include a second set of tags containing another set of related terminology;
   generating a second consolidated term based on the second set of tags;
   resolving the database including the second set of tags into a revised supplemental semantic class comprising the initial semantic classes coupled with a revised set of labels including the second consolidated term as a second new label; and
   receive a classification of a number of the content items to be classified into the revised supplemental semantic class.

9. A system comprising:
storage configured to store instructions; and
one or more processors configured to execute the instructions and cause the one or more processors to:
  detect that a threshold number of content items in a corpus of content items include related terminology, the corpus of content items being associated with initial semantic classes that classify the corpus of content items;
  generate, via a semantics class computer module, a consolidated term for a tag of a new semantic class based on the related terminology, the new semantic class being in addition to the initial semantic classes classifying the corpus of content items; and
  expand the initial semantic classes into an expanded set of semantic classes by adding the tag corresponding to the new semantic class.

10. The system of claim 9, wherein the one or more processors is configured to execute the instructions and cause the one or more processors to:
  receive a classification of a number of the content items into the new semantic class.

11. The system of claim 9, wherein generating the new semantic class comprises generating a new semantic sub-class that defines a subset of terminology refining an existing semantic class.

12. The system of claim 11, wherein the one or more processors is configured to execute the instructions and cause the one or more processors to:
  resolve a database including the tags into a supplemental semantic class comprising the initial semantic classes coupled with a set of labels including the consolidated term as a new label, wherein the new label is associated with the new semantic class.

13. The system of claim 12, wherein the resolving the database expands the initial semantic classes by adding the new label that serves as a subset classification of the initial semantic classes.

14. The system of claim 12, wherein the one or more processors is configured to execute the instructions and cause the one or more processors to:
  in addition to the new label, add a catch-all label to the set of labels associated with other tags that do not contain the related terminology.

15. The system of claim 12, wherein the new semantic class classifies a different subset from other subsets of the initial semantic classes.

16. The system of claim 12, wherein the one or more processors is configured to execute the instructions and cause the one or more processors to:
  detect that another threshold number of second content items of the corpus of content items include a second set of tags containing another set of related terminology;
  generate a second consolidated term based on the second set of tags;
  resolve the database including the second set of tags into a revised supplemental semantic class comprising the initial semantic classes coupled with a revised set of labels including the second consolidated term as a second new label; and
  receive a classification of a number of the content items to be classified into the revised supplemental semantic class.

17. A non-transitory computer-readable medium comprising instructions, the instructions, when executed by a computing system, cause the computing system to:
  detect that a threshold number of content items in a corpus of content items include related terminology, the corpus of content items being associated with initial semantic classes that classify the corpus of content items;
  generate, via a semantics class computer module, a consolidated term for a tag of a new semantic class based on the related terminology, the new semantic class being in addition to the initial semantic classes classifying the corpus of content items; and
  expanding the initial semantic classes into an expanded set of semantic classes by adding the tag corresponding to the new semantic class.

18. The non-transitory computer-readable medium of claim 17, wherein the non-transitory computer-readable medium further comprises instructions that, when executed by the computing system, cause the computing system to:
  receive a classification of a number of the content items into the new semantic class.

19. The non-transitory computer-readable medium of claim 17, generating the new semantic class comprises generating a new semantic sub-class that defines a subset of terminology refining an existing semantic class.

20. The non-transitory computer-readable medium of claim 19, wherein the non-transitory computer-readable medium further comprises instructions that, when executed by the computing system, cause the computing system to:
  resolve a database including the tags into a supplemental semantic class comprising the initial semantic classes coupled with a set of labels including the consolidated term as a new label, wherein the new label is associated with the new semantic class.

\* \* \* \* \*